United States Patent Office 3,129,226
Patented Apr. 14, 1964

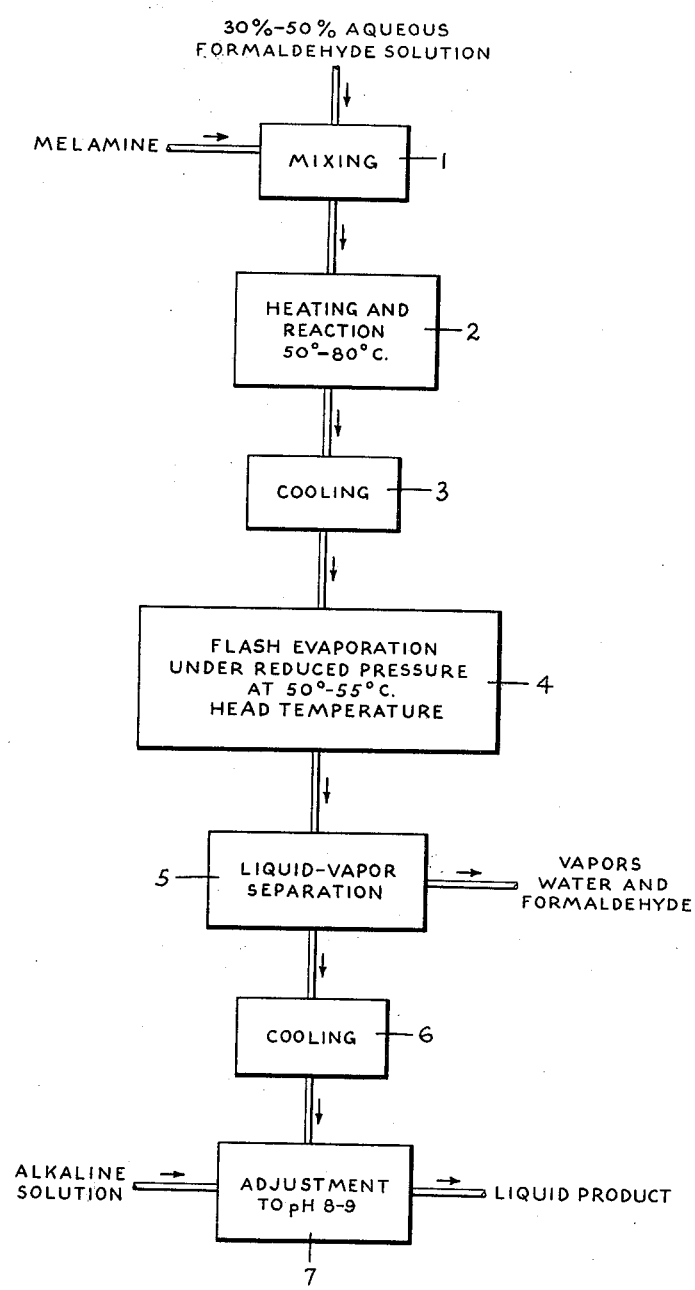

3,129,226
SOLUTIONS OF MELAMINE-FORMALDEHYDE REACTION PRODUCTS AND PROCESSES FOR THEIR PRODUCTION
George K. Cleek, Hopewell, and Alexander Sadle, Petersburg, Va., assignors to Allied Chemical Corporation, New York, N.Y., a corporation of New York
Filed Oct. 13, 1958, Ser. No. 766,772
5 Claims. (Cl. 260—249.6)

This invention relates to processes for the production of concentrated aqueous solutions of melamine-formaldehyde reaction products and to compositions, producible by those processes, which are especially suitable as means for the economical shipment of the melamine and formaldehyde contained therein and for use in the production of aminoplastic resins, for which melamine and formaldehyde are commonly employed.

Melamine is generally marketed as the solid material packed in bags or other containers of relatively small size. Formaldehyde is marketed in the form of dilute aqueous solutions. The most common commercial products are solutions containing about 35%–37% formaldehyde. In shipping such solutions, the transportation costs are largely expended for the transportation of the water content of the solution.

It is an object of our invention to provide a process whereby the solid melamine and aqueous formaldehyde solutions may be converted into a single liquid product containing substantially 75% to 85% by weight of total formaldehyde and melamine (total solids in the solution), which is sufficiently stable for it to be transported and stored for reasonable periods of time and is suitable for use, upon addition of the requisite increment of melamine, for the production of aminoplastic resins by processes commonly employed for the production of such resins from the separate materials, solid melamine and aqueous solutions of formaldehyde. By providing these concentrated liquid compositions, the cost of transporting a quantity of water far exceeding the quantity of formaldehyde is largely eliminated. Thus the net shipping weight of resin-forming cargo is reduced to approximately ³⁄₇ that involved in shipping formalin. The two materials may be shipped in tank cars, without having to provide individual containers for the melamine.

In operating in accordance with our invention to produce the desired stable, aqueous melamine-formaldehyde liquid products, melamine is mixed with an about 30% to about 50% aqueous formaldehyde solution in amounts such that the formaldehyde-melamine mol ratio in the mixture is substantially 14 to 16 mols formaldehyde for every one mol of melamine. This mixture is heated to and maintained at reaction temperatures until the free formaldehyde content of the reaction mixture drops to a value in the range substantially about 62% to about 66% of the total formaldehyde. The reaction product thus obtained and containing this amount of free formaldehyde is evaporated under conditions of reduced pressure, below atmospheric, temperature and rate of heat supplied to the liquid, which minimize the loss of formaldehyde from the liquid being concentrated. The evaporation of water from the mixture is carried to a point at which the total solids content of the concentrated liquid is in the range about 75 to about 85 weight percent, preferably is about 80 weight percent, and the mol ratio of formaldehyde to melamine is about 12/1 to about 16/1. The hydrogen ion concentration in the concentrated solution is adjusted to substantially pH 8–9.

We have found that the aqueous melamine-formaldehyde concentrates prepared by such a procedure are stable for one month or longer during transportation or storage at temperatures of about 20° C. to about 30° C. The concentrates are clear liquids as initially prepared and do not gel or become thixotropic or unduly increase in viscosity for periods of one month or more at those temperatures. Nor do they deposit amounts of solid precipitate sufficient to impair their use for the production of aminoplastic resins.

Our invention is also directed to such stable aqueous concentrates containing reaction products of melamine with aqueous formaldehyde solutions, which concentrates are characterized by containing about 75 to about 85 weight percent, preferably about 80 weight percent, total solids, a mol ratio of formaldehyde to melamine of about 12/1 to about 16/1 and less than 42 weight percent free formaldehyde, and, as initially prepared, having a pH of substantially 8–9.

Reaction conditions which are critical for the production of the desired stable melamine-formaldehyde concentrate, and critical values for the composition of the products of our invention, have been given above. The following is in further amplification of conditions for carrying out our process which we prefer to employ or which it is within the skill of the chemist to recognize as properly employed in operating in accordance with our invention.

Any of the commonly available aqueous formaldehyde solutions may be employed as a starting material for our process, including the so-called inhibited and uninhibited commercial formaldehyde or formalin solutions. In general, aqueous formaldehyde solutions are slightly acidic. Normally they have a pH no lower than about 3. It appears the addition of the melamine to the acidic formaldehyde solutions results in a buffered solution. In any event, the reaction mixture formed by the addition of the melamine to the acidic formaldehyde solutions provides the proper conditions with respect to pH of the reaction mixture without any adjustment of its pH by addition of an acid or base.

At temperatures no higher than about 30° C., reaction of melamine with aqueous formaldehyde or of their reaction products present in the reaction mixtures formed in carrying out the processes of our invention, is so slow that mixtures of these materials may be held for a considerable length of time without substantial change in composition. At temperatures below 50° C., reaction of melamine with aqueous formaldehyde takes place so slowly that it would require an unduly long reaction period to form the desired reaction product. At temperatures materially above 80° C., the reaction proceeds very rapidly and it becomes increasingly difficult to control the reaction and to stop it when the free formaldehyde content of the reaction mixture is at a desired value of about 62% to about 66% of the total formaldehyde. In view of these considerations, while it is not impossible to employ reaction temperatures outside of the range about 50° C. to about 80° C., we much prefer to heat the mixture of melamine and aqueous formaldehyde at temperatures in the range of about 50° C. to not substantially above 80° C. to produce the desired reaction product.

If the reaction product thus produced is immediately subjected to the concentration step carried out under reduced pressure, further reaction is so minimized as to give the desired compositions of the resulting concentrate. However, it is preferred, when the desired degree of reaction has been attained to cool the reaction mixture promptly to temperatures below 30° C., thus stopping further reaction and allowing greater variations in the design and operation of a plant utilizing our invention.

The concentration of the aqueous melamineformaldehyde solution is carried out under conditions minimizing the amount of formaldehyde which is carried out of the solution with the evaporated water. Processes accomplishing this evaporation of water from aqueous formaldehyde solutions are known to the art, and the effect of evaporation conditions of pressure, temperature and rate of heat transfer are within the knowledge of the chemical engineers experienced in the evaporation of aqueous formaldehyde solutions. Thus, it is well known that as lower temperatures are employed, with appropriately reduced pressures at which the water is vaporized, and as the heat required for vaporization of the desired amount of water is supplied more rapidly, thus decreasing the time during which the material undergoing evaporation is subjected to the elevated temperatures, the losses of formaldehyde and further reaction of the materials present in the solution being concentrated, are decreased. A specific procedure, and conditions for its operation suitable for concentrating the reaction product of the melamine and aqueous formaldehyde, will be hereinafter described, but it should be understood that the specific conditions set forth for the concentration step may be varied without departing from the scope of our invention.

The meaning of certain terms and expressions as they are used throughout this specification and in the accompanying claims is as follows:

The values of the "free formaldehyde" content of a material are those determined by the sodium sulfite method at 0° C., reported for measurement of free formaldehyde in U.S. Patent 2,485,203, issued October 18, 1949.

For the purpose of determining the mol ratios of formaldehyde to melamine present in the concentrates, the formaldehyde content is determined from carbon and nitrogen analysis; carbon by combustion and nitrogen by the Kjeldahl method. The analytical results are calculated by the following equation:

$$\text{Wt. percent HCHO} = \frac{30}{12}\left[\text{wt. percent C} - \left(\frac{3 \times 12}{6 \times 14} \times \text{wt. percent N}\right)\right]$$

The accompanying drawing is a flow diagram illustrating the several operations and the materials employed therein in carrying out the processes of the examples which will be given of the best known modes of operating our process. It is to be understood, however, that all of the several operations illustrated in the drawing need not be carried out separately and that, except as particularly stated in this specification and in the claims, not every step indicated in the drawing is necessary to operating in accordance with our invention.

With reference to the drawing, in step 1 an aqueous formaldehyde solution containing 30% to 50% by weight formaldehyde is mixed with solid melamine in the ratio of 14 to 16 mols formaldehyde for every one mol melamine. In step 2 this mixture is heated at temperatures in the range 50° C. to not substantially above 80° C. until its free formaldehyde content is in the range about 62% to about 66% of the total formaldehyde. The reaction mixture is cooled in step 3 to about 30° C. or lower to prevent the reaction continuing to reduce the free formaldehyde content of the mixture to substantially below 62% before it is passed into evaporation step 4.

In our preferred method of evaporating the aqueous melamine-formaldehyde reaction product, it is introduced as a jet of the liquid ejected upwardly into the bottom of a vertical heat exchange tube in which a reduced pressure of about 45–55 mm. Hg is maintained. The tube is heated by a steam jacket and is long and of relatively small cross-sectional area. As the liquid enters the tube, it is dispersed as small particles carried upwardly in the vapors flashed from the liquid at the reduced pressure. The mixture of liquid and vapors leaves the top of the evaporator tube at a head temperature of 50° C. to 55° C., with the liquid concentrated until it contains about 75 to about 85 weight percent, preferably about 80 weight percent, total solids and less than 42 weight percent free formaldehyde. Suitable average residence times for the material in the evaporator are about 5 to about 15 seconds.

In this particular type evaporator, liquid tending to condense or gather on the walls of the tube and to flow downwardly toward the bottom of the tube, is dispersed by the liquid ejected at the bottom of the tube and is carried by the rapidly flowing vapors upwardly to the top of the tube and is withdrawn in the liquid-vapor mixture.

This type of evaporation, known as a "long tube evaporation" is particularly suitable for concentrating the aqueous melamine-formaldehyde reaction products. It minimizes the loss of formaldehyde in the vapors which in step 5 are separated from the liquid concentrate. If desired, the formaldehyde contained in these vapors may be recovered for re-use in this process.

The liquid concentrate is cooled in step 6, and in step 7 it is adjusted to pH 8–9 by addition of a water solution of ammonium hydroxide or of a caustic alkali such as sodium hydroxide or of other alkaline material.

Specific modes of operating in accordance with our invention and specific products thus obtained are illustrated by the following examples. In all of these examples the amount of alkaline solution added to the melamine-formaldehyde concentrate to adjust it to the desired pH was insufficient to cause any appreciable change in the composition of the concentrate.

*Example 1*

Uninhibited commercial 37% aqueous formaldehyde having a pH of 3.2 and containing about 0.3% methanol as an impurity was mixed with solid melamine to form a mixture containing 15 mols formaldehyde for every one mole of melamine. This mixture was heated and maintained at temperatures increasing from 50° C. to 83° C. for a period of 55 minutes and then cooled to 25° C. to stop further reaction. The material thus prepared contained 21.6% free formaldehyde, which was equivalent to 64.4% of the total formaldehyde. It was flash evaporated in a long tube evaporator under 47 mm. Hg pressure at a head temperature of 55° C. to a total solids concentration of 82.2 weight percent. This liquid concentrate contained a ratio of 14.56 mols formaldehyde for every one mol melamine and free formaldehyde amounting to less than 42 weight percent of the concentrate. The concentrate was cooled and a 0.5 N caustic soda solution added to adjust its pH to 8.0.

As initially prepared, the product was a clear liquid having a viscosity of 683 cps. (centipoises). After standing at room temperatures for 50 days its viscosity had increased to 1020 cps. but the liquid still remained clear and was adequately fluid for it to be readily used in the production of a melamine-formaldehyde resin.

*Example 2*

A mixture of 37% uninhibited aqueous formaldehyde and melamine containing 15 mols formaldehyde for eevry one mol melamine was heated at 55° C. rising to 76° C., for 43 minutes. At the end of that time the product contained 21.0% free formaldehyde which was equivalent to 62.6% of the total formaldehyde.

This material was flash evaporated in a long tube evaporator under a pressure of 40 mm. Hg and with a head temperature of 55° C., to a total solids content of 80.95 weight percent. This liquid concentrate contained 14.53 mols formaldehyde for every one mol melamine and less than 42 weight percent free formaldehyde. It was cooled and its pH adjusted to 7.9 by addition of 0.5 N caustic soda solution.

As initially prepared, this concentrate was a clear liquid. After 17 days' storage at room temperature, it was still fluid, but a very light precipitate had formed. After 30 days' storage it was still sufficiently fluid for it to be used, with additional melamine, for the production of aminoplastic resins in the same manner as they are produced from solid melamine and aqueous formaldehyde solutions separately used as the initial materials for the production of the resins.

We claim:

1. The process for the production of a stable aqueous melamine-formaldehyde concentrate which comprises heating at temperatures above about 30° C. a mixture of about 30% to about 50% aqueous formaldehyde solution and melamine containing substantially 14 to 16 mols formaldehyde for every one mole of melamine until the free formaldehyde content of the mixture drops to about 62 to about 66 weight percent of the total formaldehyde, evaporating the resulting reaction product containing said free formaldehyde content under reduced pressure below atmospheric until the concentrated liquid contains about 75% to about 85% total formaldehyde and melamine and a mol ratio of formaldehyde to melamine about 12/1 to about 16/1, and adjusting the hydrogen ion concentration in the resulting concentrate to substantially pH 8–9, said concentrate neither gelling nor becoming thixotropic for a period of one month's storage at temperatures of 20° C. to 30° C. after its initial preparation.

2. The process of claim 1 in which the mixture of formaldehyde solution and melamine is heated in the range about 50° C. to and including about 80° C.

3. The process of claim 2 in which the reaction product resulting from heating the mixture of aqueous formaldehyde and melamine is evaporated under a reduced presusre of about 45–55 mm. Hg, with the concentrated liquid and evolved vapors leaving the evaporation at about 50° C. to about 55° C.

4. The process of claim 1 in which the mixture of aqueous formaldehyde solution and melamine is heated at temperatures in the range above about 30° C. to and including about 80° C.

5. A stable, aqueous, liquid concentrate prepared by heating at above about 30° C., a mixture of about 30% to about 50% aqueous formaldehyde solution and melamine containing substantially 14 to 16 mols formaldehyde for every one mol of melamine until the free formaldehyde content of the mixture drops to about 62 to about 66 weight percent of the total formaldehyde, evaporating the resulting reaction product containing said free formaldehyde content under reduced pressure below atmospheric until the concentrated liquid contains about 75% to about 85% total formaldehyde and melamine and a mol ratio of formaldehyde to melamine about 12/1 to about 16/1, and adjusting the hydrogen ion concentration in the resulting concentrate to substantially pH 8–9, which concentrate is further characterized by containing less than 42 weight percent free formaldehyde, about 75 to about 85 weight percent total formaldehyde and melamine and a mol ratio of formaldehyde to melamine of about 12/1 to about 16/1, having a pH of substantially 8–9 as initially prepared, and neither gelling nor becoming thixotropic for a period of one month storage at temperatures of 20° C. to 30° C. after its initial preparation.

References Cited in the file of this patent

UNITED STATES PATENTS

| 2,237,092 | Swain et al. | Apr. 1, 1941 |
| 2,426,770 | Grim | Sept. 2, 1947 |
| 2,440,732 | Yates | May 4, 1948 |
| 2,640,041 | Bruner et al. | May 26, 1953 |
| 2,947,750 | Gerg | Aug. 2, 1960 |

FOREIGN PATENTS

| 5,399 | Japan | July 6, 1956 |
| 491,988 | Canada | Apr. 14, 1958 |

OTHER REFERENCES

Chemical Abstracts, vol. 52, cols. 9653 to 9654, and index 1625s (1958) [Abstract of Japanese Patent, 5,399 (1956), issued July 6, 1956, to Iizuka].